United States Patent [19]

Roberts et al.

[11] Patent Number: 5,128,659
[45] Date of Patent: * Jul. 7, 1992

[54] INSTRUMENT DISPLAY APPARATUS

[75] Inventors: John K. Roberts, Sheboygan, Wis.; Barnes W. Woodhall, San Diego, Calif.

[73] Assignee: K. W. Muth Company, Inc., Sheboygan, Wis.

[*] Notice: The portion of the term of this patent subsequent to Apr. 2, 2008 has been disclaimed.

[21] Appl. No.: 408,692

[22] Filed: Sep. 18, 1989

Related U.S. Application Data

[63] Continuation-in-part of Ser. No. 310,644, Feb. 15, 1989, Pat. No. 5,005,009, which is a continuation-in-part of Ser. No. 156,122, Feb. 16, 1988, abandoned.

[51] Int. Cl.$^5$ ............................................. G09G 3/00
[52] U.S. Cl. .................................... 340/705; 359/630; 340/980
[58] Field of Search ............... 340/705, 795, 945, 947, 340/980; 350/174; 362/23, 29, 30; 116/48, 49; 359/13, 618, 629, 630

[56] References Cited

U.S. PATENT DOCUMENTS

| | | |
|---|---|---|
| 3,163,949 | 1/1965 | Gley . |
| 3,230,819 | 1/1966 | Noxon . |
| 3,317,906 | 5/1967 | Baldridge . |
| 3,574,283 | 4/1971 | Albers . |
| 3,798,529 | 3/1974 | Jones . |
| 3,829,196 | 8/1974 | Deb . |
| 3,881,809 | 5/1975 | Fergason et al. . |
| 3,887,273 | 6/1975 | Griffiths . |
| 3,915,548 | 10/1975 | Opittek et al. . |
| 4,190,832 | 2/1980 | Mohler . |
| 4,347,508 | 8/1982 | Spooner . |
| 4,398,799 | 8/1983 | Swift . |
| 4,449,024 | 5/1984 | Stracener . |
| 4,453,163 | 6/1984 | Garner et al. . |
| 4,560,233 | 12/1985 | Banbury . |
| 4,635,033 | 1/1987 | Inukai et al. . |
| 4,636,782 | 1/1987 | Nakamura et al. . |
| 4,652,870 | 3/1987 | Steward . |
| 4,740,780 | 4/1988 | Brown et al. . |
| 4,742,389 | 5/1988 | Schiffman . |
| 4,768,300 | 9/1988 | Rutili . |
| 4,795,223 | 1/1989 | Moss . |
| 4,831,366 | 5/1989 | Iino . |
| 4,839,589 | 6/1989 | Heinle . |
| 4,840,465 | 6/1989 | Loy et al. . |
| 4,847,555 | 7/1989 | Stammer et al. . |
| 5,005,009 | 4/1991 | Roberts . |

FOREIGN PATENT DOCUMENTS

| | | |
|---|---|---|
| 0216014 | 4/1987 | European Pat. Off. . |
| 0216692 | 4/1987 | European Pat. Off. . |
| 0088925 | 5/1985 | Japan . |
| 0012450 | 1/1986 | Japan . |
| 2154021 | 8/1985 | United Kingdom . |

Primary Examiner—Jeffery A. Brier
Attorney, Agent, or Firm—Godfrey & Kahn

[57] ABSTRACT

An instrument display apparatus for use in combination with a substantially transparent panel including an instrument to be displayed positioned adjacent to the transparent panel and which is adapted to reflect ambient light onto the substantially transparent panel, and an artificial lighting assembly which is adapted to selectively supply light to the instrument whereby a reflection of the instrument may be viewed in the windscreen regardless of level of ambient natural light.

6 Claims, 8 Drawing Sheets

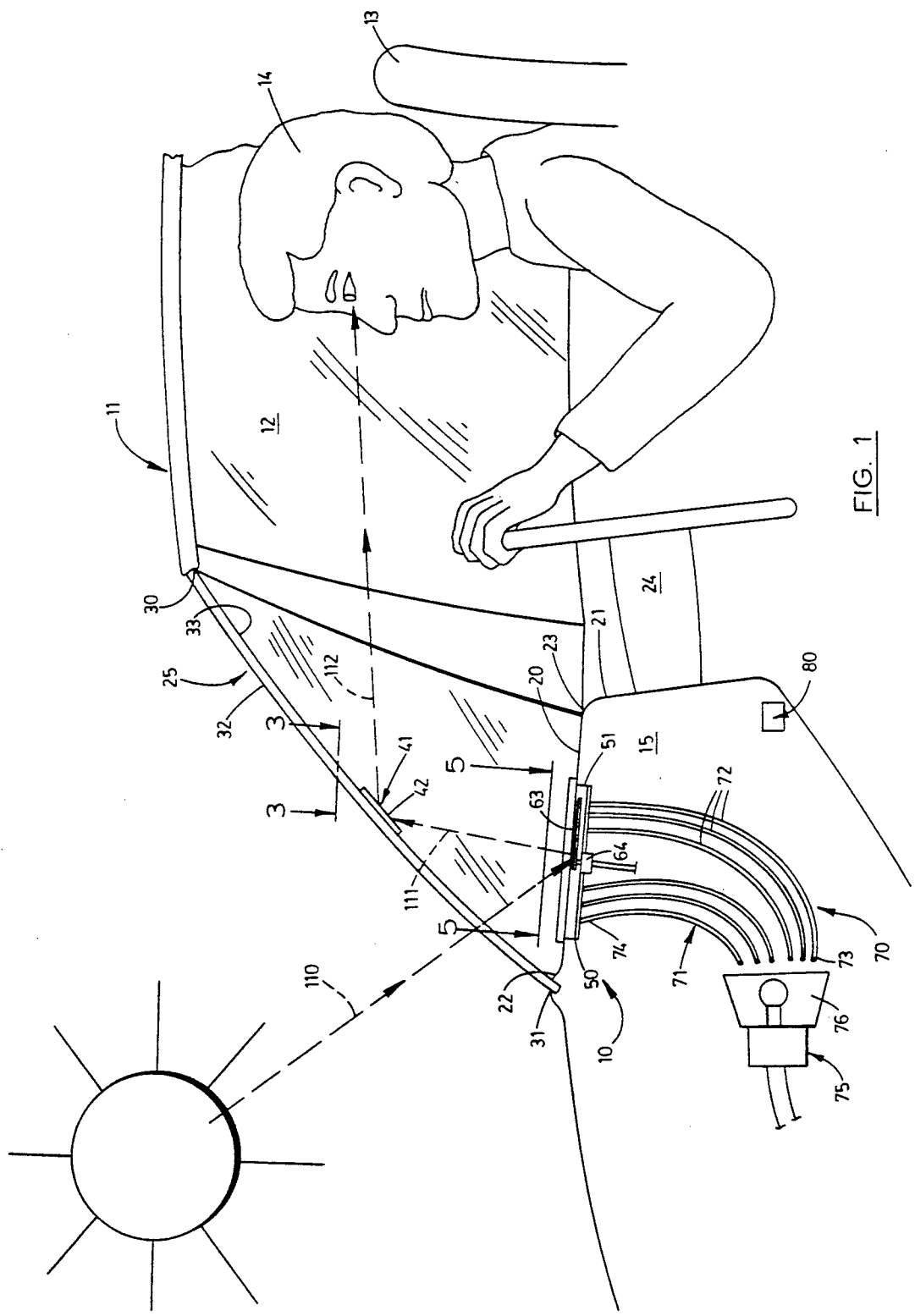

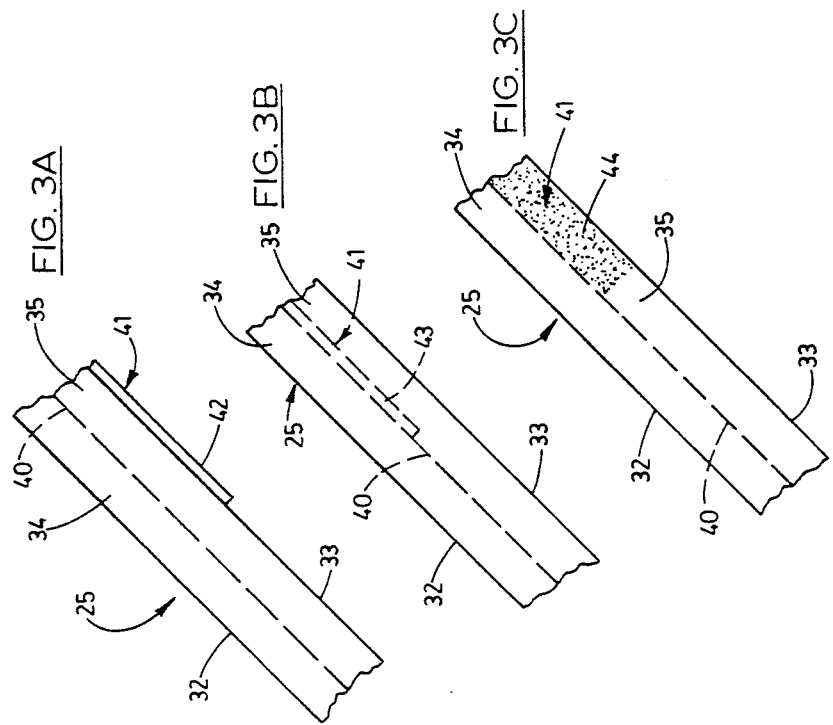
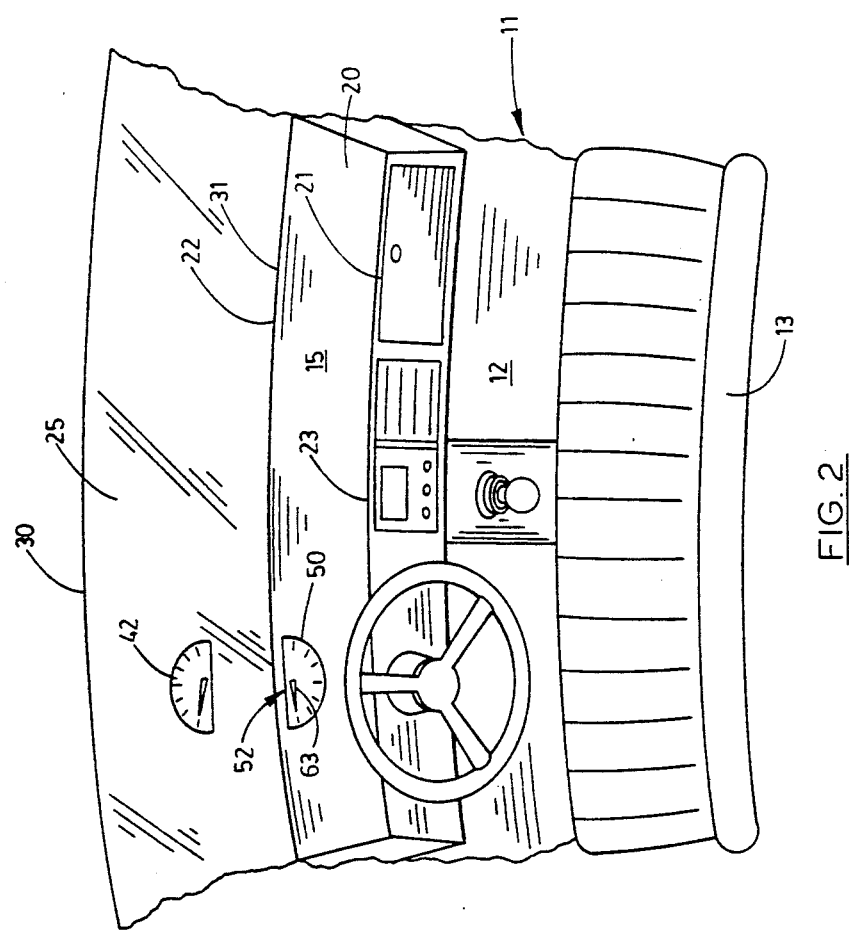

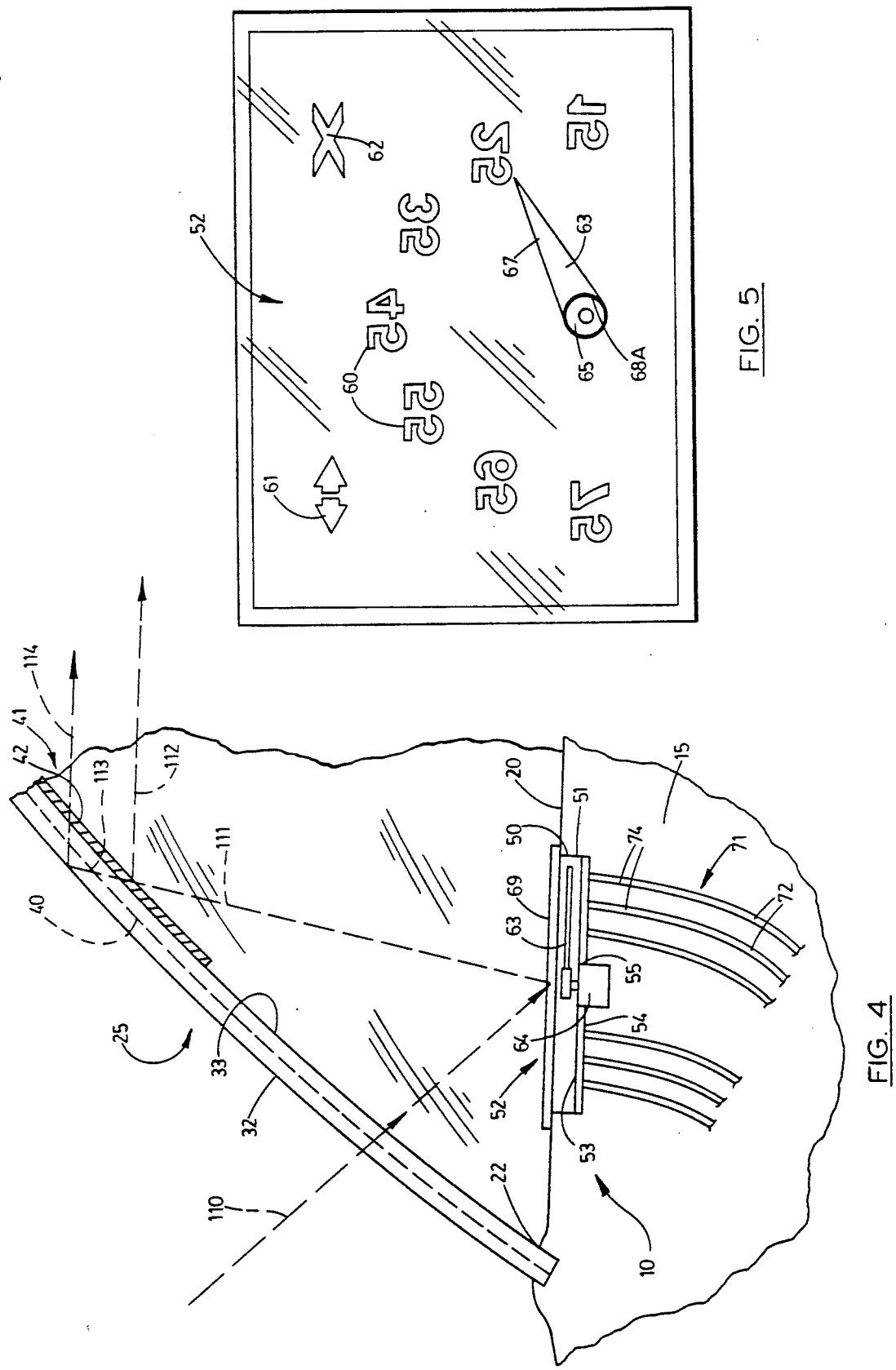

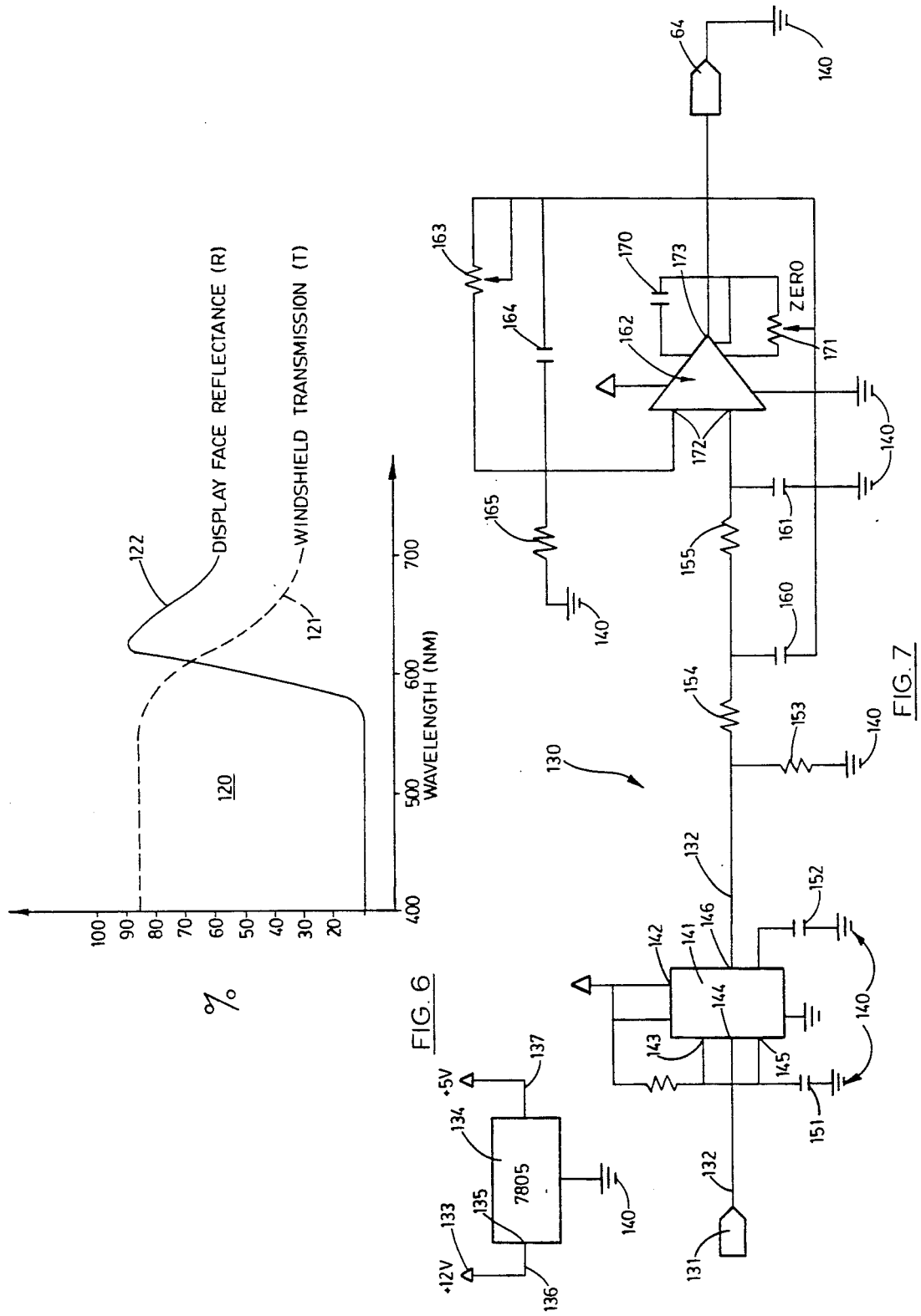

INSTRUMENT DISPLAY APPARATUS

This patent application is a continuation-in-part of U.S. Pat. Application Ser. No. 07/310,644 filed on Feb. 15, 1989, and which is now U.S. Pat. No. 5,005,009. Application Ser. No. 07/310,644 was a continuation-in-part of Application Ser. No. 07/156,122, filed on Feb. 16, 1988, now abandoned.

BACKGROUND OF THE INVENTION

1. Field of the Invention

The present invention relates to an instrument display apparatus and more particularly to such a device which is adapted to produce a reflected image of an instrument in a windscreen or other similar assembly such that an operator may view same while simultaneously viewing out through the windscreen.

2. Description of the Prior Art

The development of a "HEADS-UP" display and which hereinafter will be referred to as HUD, had its genesis in the military aircraft field. As should be understood, in the operation of high speed aircraft such as fixed wing and rotary wing attack aircraft which are designed for combat, it is extremely hazardous for the pilot or a crew member such as a weapons officer to momentarily divert their attention from a hostile target or other point of interest in the immediate vicinity of the aircraft to read the dials, gauges, instruments, warning indicators, etc. on the assorted instrument panels and other displays positioned in various locations in the cockpit area but normally positioned below the average line of sight of the observer.

Those skilled in the art have long recognized that a HUD would be quite useful in such dangerous sports as high-speed motor car racing and could perhaps be helpful in the day-to-day driving activities of average motorists.

In operation, a HUD allows an operator of a conveyance such as all manner of overland vehicles, boats, aircraft, motorcycles, etc. to view substantially within their line of sight, critical instrumentation displays, such as speed, fuel consumption, oil pressure, etc. without substantially diverting their vision and attention from an area immediately in front of the vehicle. Further, such devices may be utilized in other applications such as in ticket booths, bank teller windows, etc.

The prior art is replete with several examples of HUDs which are designed for specific purposes and applications. Examples of prior art HUDs and related assemblies are shown in several U.S. Pat. Nos., particularly Steward 4,652,870; Banbury 4,560,233; Spooner 4,347,508; and Garner 4,453,163, to name but a few.

While it is speculated that the utilization of a HUD could conceivably improve the safe operation of a motor vehicle, the prior art devices have not been widely embraced for such an application. This has been due, in large measure, to the physical size and complexity of these prior art devices and their related assemblies. Further, commercial embodiments of HUDs installed in recently manufactured motor vehicles have revealed numerous inherent shortcomings which have detracted from their usefulness.

For example, one major drawback of the most recently manufactured HUDs is that the purchase price for same is usually cost prohibitive for most purchasers. Further, these devices do not operate effectively in many commonly encountered operational environments. By way of illustration, the commercially available HUDs individually employ digital, vacuum fluorescent displays, the light of which is reflected in an adjacent windscreen and which may be viewed by an operator. In one of the commercial embodiments, a windscreen viewing enhancement device is located somewhat out of the line of sight of the operator and which is adapted to reflect the light emitted by the display. Further, the other commercial embodiment employs, in combination with the digital vacuum fluorescent display, several optically precise mirrors which individually manipulate the light generated by the display in a predetermined fashion and projects it onto the adjacent windscreen. While these devices operate with some degree of success, they become inoperable in extremely bright light, or are difficult to read when the vehicle moves from a brightly lit environment into a shaded area.

Still another problem encountered with the prior art HUDs which have been designed for use in motor vehicles is the propensity for such devices to exhibit a characteristic inability to cooperate with other assemblies which are mounted in the area of the dashboard. Further, and with respect to one of the commercially available HUDs, the operator's eyes must be positioned within a very narrow cone of vision. If the operator moves his head outside of this cone, he will not be able to see the display. In addition, the prior art devices are not aesthetically appealing and therefore detract from the stylish appearance of the vehicle upon which it is installed.

Therefore, it has long been known that it would be desirable to have an instrument display apparatus which could be employed in all manner of overland vehicles, watercraft or aircraft, which could be manufactured and purchased at a relatively nominal cost, which is both highly efficient in operation and capable of operating in environments having various ambient light levels for the purpose of displaying an instrument face on an adjacent windscreen and within the line of vision of the operator, and which reduces to an absolute minimum the assorted problems inherent with the related prior art devices adapted to perform the identical function.

OBJECTS AND SUMMARY OF THE INVENTION

It is therefore an object of the present invention to provide an improved instrument display apparatus.

Another object of the present invention is to provide such an apparatus which can be directly controlled, either manually, or automatically, under all types of ambient lighting conditions to provide an image which is clear and distinct.

Another object of the present invention is to provide an apparatus which may be manufactured as an integral component of a vehicle or which further can be manufactured in the manner of a retrofit.

Another object of the present invention is to provide such an apparatus which fits easily into existing vehicle dashboard designs and which further does not require substantial additional subassemblies to support same in the vehicle.

Another object of the present invention is to provide an apparatus which absorbs or otherwise substantially blocks light waves which would otherwise create an undesirable optical effect.

Another object of the present invention is to provide an apparatus wherein the display face emits light waves in a frequency which is substantially attenuated by the windscreen.

Another object of the present invention is to provide an apparatus which operates in combination with windscreens having various angular inclinations, and which further is not rendered inoperable by external interference such as bright sunlight, the bright lights of oncoming vehicles, or other conditions which may drastically alter the ambient background lighting environment.

Another object of the present invention is to provide an apparatus which is characterized by ease of installation, simplicity of construction, and which further can be sold at a relatively nominal price when compared with related prior art devices.

Another object of the present invention is to provide an apparatus which is easily accessible for maintenance, modification or the like.

Another object of the present invention is to provide an apparatus which is operable to obtain the individual benefits to be derived from related prior art devices while avoiding the detriments individually associated therewith.

Further objects and advantages are to provide improved elements and arrangements thereof in an instrument display apparatus for the purposes described which is dependable, economical, durable, and fully effective in accomplishing its intended purposes.

These and other objects and advantages are achieved in an instrument display apparatus for use in combination with a substantially transparent panel and wherein in the preferred embodiment the apparatus includes an instrument to be displayed positioned adjacent to the transparent panel and having a dead front display face including a first portion which is translucent and a second portion surrounding the first portion and which provides contrast for the first portion; and means for selectively supplying light to the first portion whereby the first portion may be viewed in the substantially transparent panel regardless of the level of ambient light.

BRIEF DESCRIPTION OF THE DRAWINGS

FIG. 1 is a fragmentary, longitudinal, side elevation view of an operator's position of a vehicle employing the apparatus of the subject invention shown in a typical operative configuration.

FIG. 2 is a rear elevation view of an operator's position of a vehicle employing the apparatus of the present invention.

FIG. 3 is a schematic, longitudinal, sectional view of several windscreens having predetermined tint fields of various characteristics, and taken from a position along line 3—3 of FIG. 1.

FIG. 4 is a somewhat enlarged, longitudinal, sectional view of a windscreen taken from a position along line 3—3 of FIG. 1 and illustrating the optical effect which creates a "ghost" of a primary reflected image.

FIG. 5 is a plan view of the apparatus of the subject invention taken from a position along line 5—5 of FIG. 1.

FIG. 6 is a graphic depiction of the light wave transmission and absorbing features of a windscreen employing a tint field in accordance with the teachings of the present invention.

FIG. 7 is a schematic diagram of a first electronic circuit employed in connection with the present invention.

FIG. 11 is a schematic diagram of a third electronic circuit employed in connection with the present invention.

DESCRIPTION OF THE PREFERRED EMBODIMENT

Figure 8:
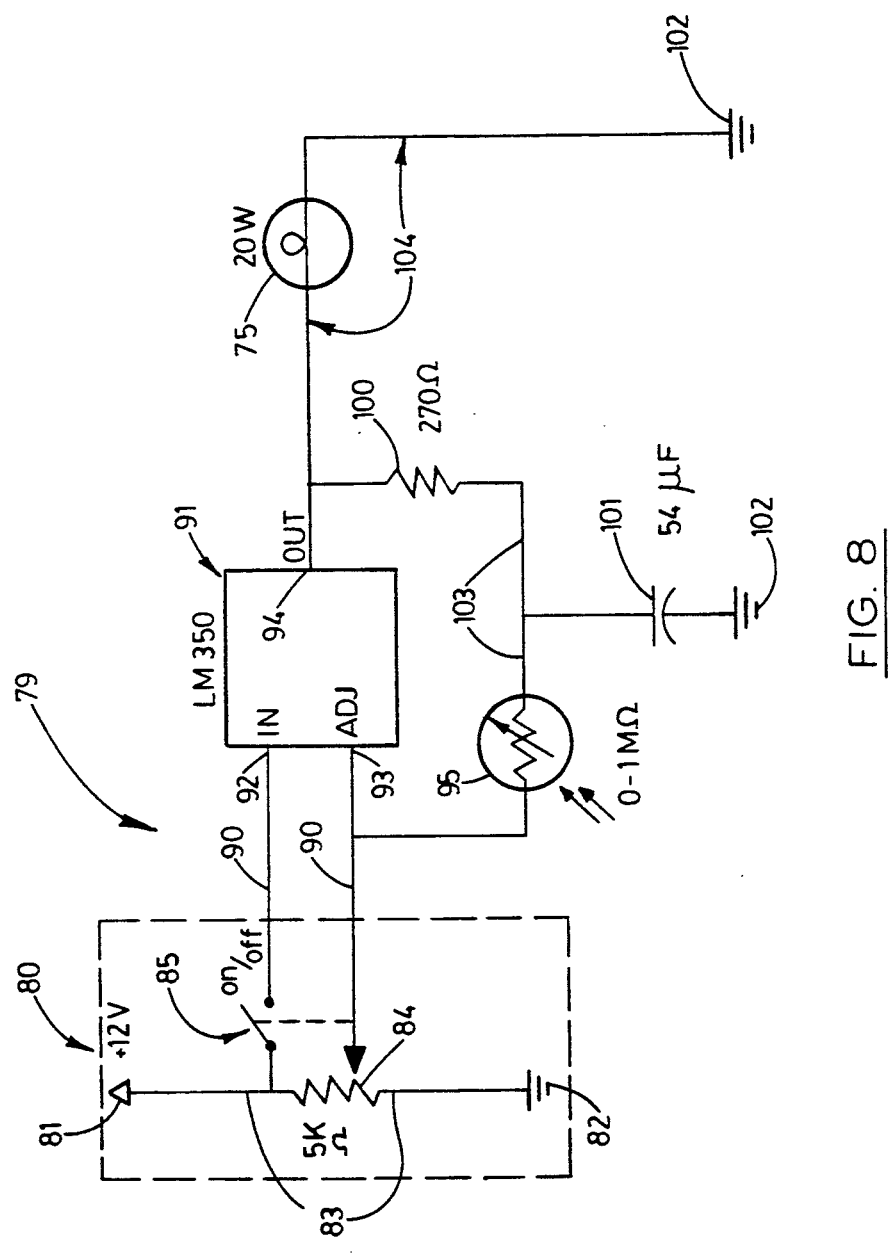
FIG. 8 is a schematic diagram of a second electronic circuit employed in connection with the present invention.

Referring more particularly to the drawings, the apparatus embodying the principles of the present invention is designated generally by the numeral 10 in FIG. 1. As depicted therein, the apparatus is shown mounted in a vehicle 11 and which includes an operator's compartment or position 12. The operator's position has a seat 13 for an operator 14. The vehicle includes a console or dashboard 15 which has a top surface 20 and which is defined by a peripheral edge 21. The peripheral edge of the dashboard includes a leading peripheral edge 22 and a trailing peripheral edge 23. Further, the vehicle includes a steering wheel 24, and a windscreen 25 is borne by the vehicle and is mounted adjacent to and in angulated, spaced relationship relative to the dashboard 15.

The windscreen 25 is defined by top and bottom peripheral edges 30 and 31, respectively, and further includes an outside surface 32 and an opposite, inside surface 33. The windshield is of traditional design that is, it may be manufactured of glass, plastic, polycarbonate, acrylic, crystal or mineral, or any other rigid transparent material. As illustrated herein, the windscreen is a piece of safety glass having first and second laminate portions 34 and 35, respectively, and which are bonded together, and which include a synthetic polymer sheet 40 which is sandwiched between the first and second laminate portions. As earlier discussed, the present invention can be utilized in all manner of overland vehicles, aircraft and water borne conveyances. Further, such devices may also be utilized in connection with bank teller's windows, control areas, ticket selling booths, and other similar environments where a transparent panel is positioned between an operator or observer and an object of interest which must be observed.

As best understood by reference to FIGS. 2 and 3 the apparatus of the subject invention includes a predetermined tint field 41 which is borne by the windscreen and which is positioned substantially within the line of sight of the operator 14 who is positioned in the operator's position 12. As best understood by a study of FIG. 3, the tint field 41 may be created by a number of different materials or substances, including all manner of different polymers, glass, mineral or other coatings. The coatings may further include metallic additives which may be applied in molten form, solution, rolling adhesive or other means of attachment either directly to the inside surface 33 of the windscreen 25 or made integral with the synthetic polymer sheet 40 which is sandwiched between the first and second laminate portions 34 and 35, respectively, of the windscreen 25. As illustrated most clearly in FIG. 3, the predetermined tint field 41 is shown, in Example A, as including a synthetic polymer sheet 42 which is secured to the inside surface 33 of the windscreen 25. An acceptable synthetic polymer sheet is commercially available and may be purchased under the brand name "LLumar window film." The film is manufactured by Martin Processing Inc. Further and as shown in Example B of FIG. 3, the predetermined tint field is made integral, as by a coating 43, or the like, with the synthetic polymer sheet 40 which is sandwiched between the first and second laminate portions 34 and 35. Additionally, and as best seen in Example C of FIG. 3, the predetermined tint field may be created by a dispersion of particulate matter, or other substances, which are made integral with the second laminate portion of the windscreen and which define the predetermined tint field.

The predetermined tint field 41 imparts to the windscreen 25 improved spectral and other optical characteristics which improve the quality of the reflected image which is produced by the apparatus 10. However, in certain applications, it should be understood that the tint field, while desireable, may be dispensed with. More particularly, and when employed, however, the tint field has a color which is adapted substantially to absorb or attenuate the frequency of light reflected or emitted by the display face. The display will be discussed in the paragraphs which follow. Further, the tint field is operable to eliminate or substantially reduce an undesirable optical effect which will hereinafter be discussed as a secondary or "ghost" image and further improves the intensity and color contrast relative to the ambient background illumination without violating standards for visible light transmission through the windscreen as mandated by the requirements of law. The optical effect which creates ghost images and the diminution of its overall deleterious effects on the operation of the present invention will be discussed in greater detail in the paragraphs which follow.

As best illustrated by reference to FIG. 1, an aperture of predetermined dimensions 50, is formed in the console 15 and is adapted to receive a supporting frame or housing 51 which encloses and surmounts an analog speedometer instrument display and which is generally indicated by the numeral 52. The analog display 52 has a top surface 53, an opposite bottom surface 54 and an aperture 55 of predetermined dimensions is formed therein. As best illustrated by reference to FIG. 5, the top surface 53 of the analog display 52, includes a display face having a plurality of reverse printed, translucent characters which are individually indicated by the numeral 60. Further, a pair of directional signaling characters, and an engine malfunction character, 61 and 62 respectively are displayed thereon. As should be understood, the directional signaling characters as well as the engine malfunction character are translucent. However, they further include a "dead front" which substantially inhibits them from reflecting ambient natural light which comes in through the windscreen. The significance of this feature will be hereinafter discussed in greater detail. Further, the remainder of the display face surrounding the translucent characters has a flat black color which provides a high contrast background for the translucent characters.

Figure 10:
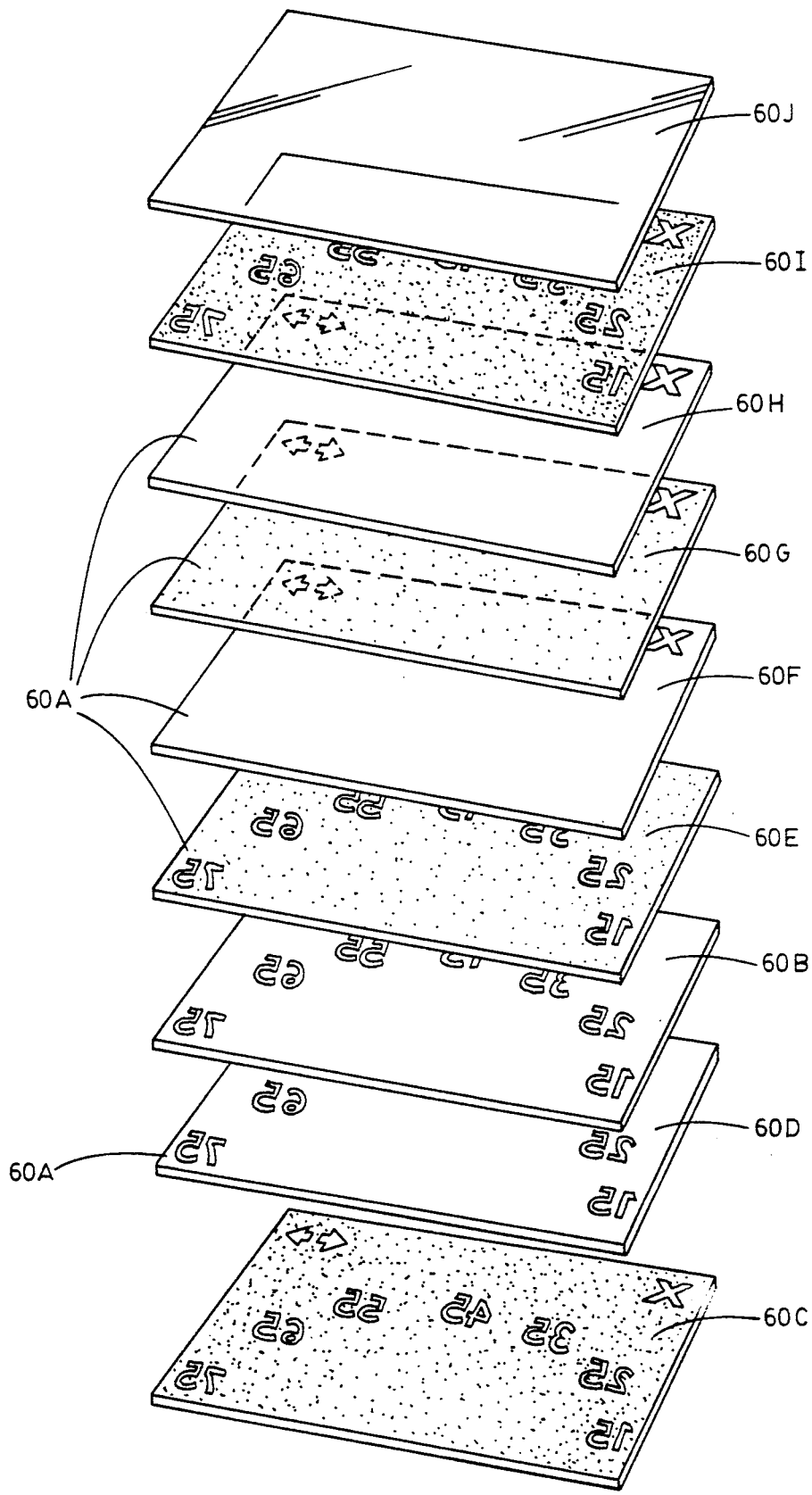
FIG. 10 is an exploded view of a reverse printed character of the present invention and showing various layers of the character.
Figure 10:
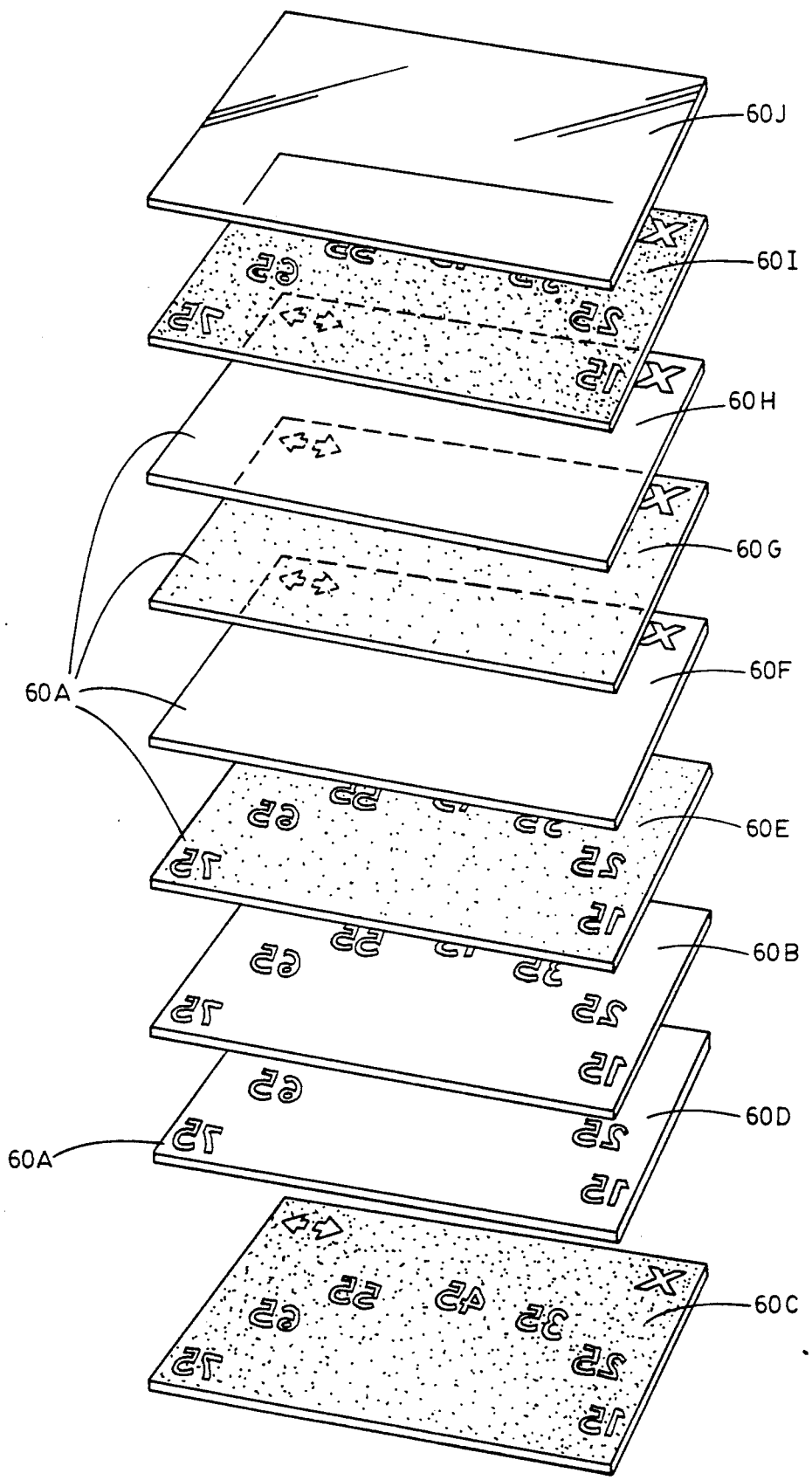

As best illustrated by reference to FIG. 10, an analog display 52 is shown in an exploded fashion and which illustrates the various layers of paint or ink 60A which are utilized in preparing such an analog display on a supporting polycarbonate substrate 60B which has a 0.060 inch thickness. Layers of flat black paint or ink 60C and white paint or ink 60D are applied to the bottom surface thereof. As illustrated, the flat black paint prevents "light leakage" from below. Further and on top of the polycarbonate substrate the following layers are applied in sequence. Layer 60E includes paint or ink which emits light in the frequency of light selected. This is utilized for the characters 60, for example. In addition, a diffuser layer 60F, and a translucent red-/orange layer 60G are utilized for the directional signaling characters and the engine malfunction character 61 and 62, respectively. A dead front layer 60H is applied and is adapted to inhibit reflection of light off of the directional signaling characters and the engine malfunction character. Respectively, although this same dead front layer may, under some circumstances, cover the entire display face. Another layer of flat black paint or ink 60I is applied and which provides contrast for the characters. Finally, an antiscratch, hard, clear, synthetic coat 60J is applied to complete the process.

A movable indicator needle 63 is rotatably mounted on the analog display 52 by a coiled spring return meter movement 64 which is fixed on the bottom surface 54 of the analog display by using suitable fasteners or adhesive (not shown). The coiled spring return meter movement is of conventional design and therefore, for the sake of brevity, is not discussed in further detail herein. However, it should be understood that the coiled spring return meter movement is operable selectively to position the indicator needle in predetermined locations along the analog display 52 thereby indicating the overland speed of the vehicle. The coiled spring return meter movement is adapted to rotatably move the indicator needle in a counterclockwise direction or in a direction whereby its reflected image appears to move in a proper direction when viewed from the operators position 12. This direction of movement is generally opposite to the traditional direction of movement of an indicator needle. This counterclockwise rotation is achieved by means of an electronic circuit which selectively delivers predetermined amounts of voltage to the coiled spring return meter movement. The operation of two embodiments of this electronic circuit will be discussed in greater detail hereinafter. Alternatively, the coiled spring return meter movement may be mechanically modified such that it will operate in the absence of an electronic circuit by reversing the position of the spring and modifying other subassemblies. Further, a device such as a stepping motor may be utilized to perform the identical function.

Figure 9:
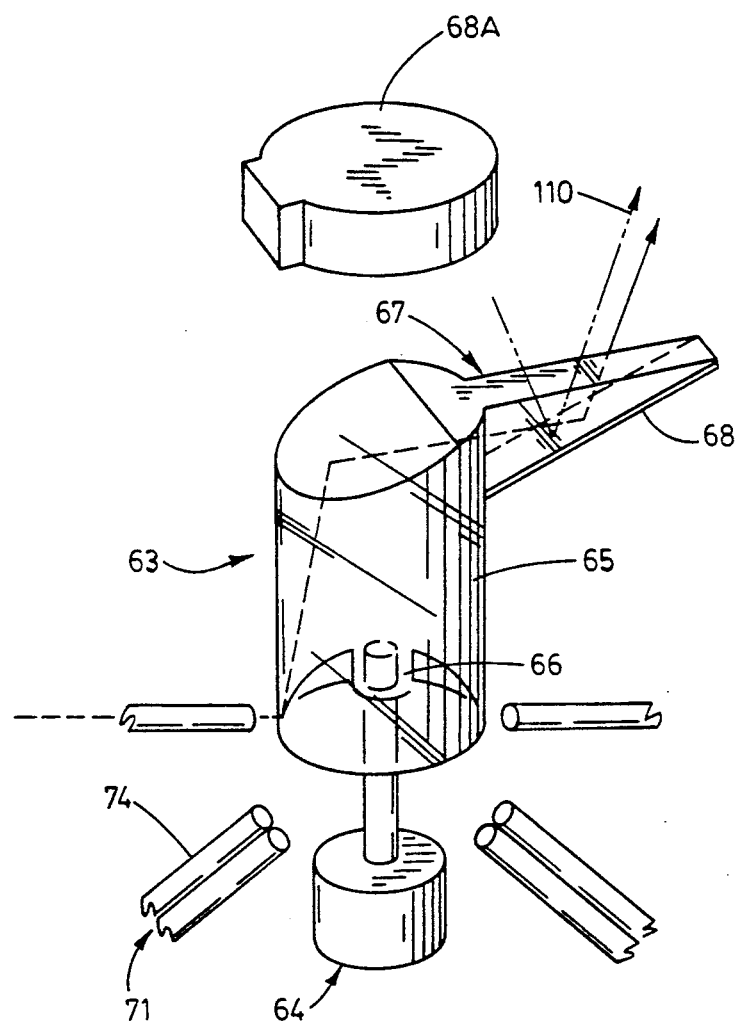
FIG. 9 is a fragmentary, longitudinal, side elevation view of an indicator needle of the present invention.

As best illustrated by reference to FIG. 9, the indicator needle 63 includes a substantially cylindrically shaped and vertically disposed barrel 65 which is manufactured from a suitable light transmitting acrylic material. The main barrel is attached to the coiled spring meter movement 64 at attachment point 66 such that it rotates simultaneously with the meter movement 64. The barrel 65 mounts an acrylic pointer assembly 67 which extends radially outwardly relative to the barrel and which is adapted to receive light discharged from a light manifold and which is reflected in the barrel and down the pointer assembly. The light manifold will be discussed in the paragraphs which follow. The pointer assembly has a bottom surface 68 which is angulated such that light reflected down the pointer assembly is reflected off of this surface and towards the windscreen 25. The bottom surface is coated with material which reflects light which lies in the frequency band which is attenuated by the tint field 41. Similarly, the bottom surface is adapted to receive and reflect ambient natural light 110 which comes in through the windscreen 25. A black cover 68 is borne by the barrel 65 in the manner shown in FIG. 9.

A dust cover 69 is borne by the housing and includes a substantially flat, transparent panel of coated and/or tempered glass, or other similar substances and which is adapted to prevent dust, moisture, etc. from interfering with the coiled spring return meter movement. The dust cover, and more particularly, the coating includes a high efficiency anti-reflection coating (HEA) which is produced by Optical Coating Laboratories, Inc. of Santa Rosa, Calif., and which is adapted to increase the clarity of the glass and minimizes reflections. This reduces the impact of glare upon the operator 14. Another means by which problems related to glare can be addressed is by using a technique called "geometric avoidance." This process includes analyzing the vehicle in such a manner as to identify possible glare paths and thereafter designing a dust cover with two or possibly three critical dimensions which, when optimally placed, inhibits any glare from reaching the operators eyes.

An auxiliary lighting assembly, and which is generally indicated by the numeral 70, is borne by the vehicle 11 and includes a light manifold 71. The light manifold is made up of a plurality of Polymethyl Methacrylate bundles having fluorinated polymer cladding. A suitable optical fiber 72 is manufactured by Mitsubishi Rayon under the "Eska" brand name. Each of the optical fibers 72 has an input end 73 and an opposite output end 74 which is fixed to the bottom surface 54 by utilizing a suitable adhesive such as an epoxy or other résin, or which is ultrasonically welded, spin welded or molded such that it is properly fixed to or disposed in adjacent spaced relation to the back surface of the display face. The output ends 74 are positioned in light emitting relation relative to the individual translucent characters 60, the directional signaling characters and engine malfunction characters 61 and 62, respectively, and the barrel 65. The input ends 73 of the individual optical fibers are positioned in substantially light receiving relation relative to a high intensity light source 75. This high intensity light source 75 may include a Tungsten halogen lamp such as that manufactured by the General Electric Company under the brand name "Precise" MR-16 VNSP Tungsten Halogen Lamp. The lamp includes a reflector 76 which focuses the light on the input ends of the optical fibers. Further, the apparatus may be constructed in such a fashion wherein a light manifold is not utilized and a light source is merely positioned in light transmitting relation relative to the bottom surface 54. In addition, a shutter assembly, not shown, may be mounted on the output ends of the optical fibers 72 which deliver light to the signaling characters and engine malfunction character respectively thereby preventing these characters from appearing in the windscreen except under signaling conditions. A shutter assembly as just described could also be mounted on the bottom surface 54 in the event the apparatus 10 does not utilize a light manifold.

An electronic circuit for selectively activating the auxiliary lighting assembly 70 is generally indicated by the numeral 79. A switching assembly 80 is borne by the dashboard 15 and further is connected to a source of 12 volt power 81 which is produced by the vehicle 11. The switching assembly 80 includes a ground 82, and a pair of electrical conductors 83 electrically connect the ground and the source of 12 volt power 81 with a 5K ohm variable resistor or potentiometer 84. A manually actuatable switch 85 selectively is movable by utilizing a wheel-like assembly, not shown, from an open to a close position. A pair of electrical leads 90 electrically connect the switch 85 and the 5K ohm potentiometer 84 to a voltage regulator 91. The voltage regulator 91 is manufactured by Motorola under the trade designation "LM350" and which is commercially available through retail electronic shops. The voltage regulator 91 includes terminals which are labeled "input", "Adj" and "output", 92, 93 and 94 respectively. A photosensor 95, a fixed resistor 100 having a value of 270 ohms, a capacitor 101 having a value of substantially 54 microfarads and a ground 102 are electrically connected together by an electrical conductor 103. An electrical conductor 104 electrically connects the output 94 and the high intensity Halogen light source 75 with the ground 102.

As earlier discussed, the tint field 41 is operable to eliminate or substantially reduce an undesirable optical effect which has been termed a secondary or "ghost image". The ghost image has the effect of producing a double-image which blurs or clutters the primary reflected image such that the primary image is difficult to view. By way of illustration, and as best seen by reference to FIG. 4, incoming rays of natural light 110 are shown as passing through the windscreen 25 and being reflected off of the top surface 53 of the analog display 52. The reflected light, which travels along a first path 111, passes through the predetermined tint field 41 and a portion of this reflected light is then reflected off of the inside surface 33. These reflected light waves form the primary reflection which appears in the tint field, the reflected light waves travelling along a second path 112 towards the observer 14. Those nonreflected light waves continue to pass through the second laminate portion 35 of the windscreen 25 and along a third path 113. The nonreflected light waves travel along the third path 113 until they are reflected off of the outside surface 32 of the windscreen 25 and travel along a fourth path 114 back towards the observer 14 to create the ghost image. However, the tint field acts upon the light traveling along the fourth path such that these light waves are absorbed or attenuated such that any ghost image is barely perceptible. In addition to the foregoing, federal law mandates that windscreens be designed to transmit at least 70% of the visible light spectrum. In order to comply with the provisions of law, the tint field has been designed to substantially and selectively attenuate or absorb only those wavelengths of light reflected or emitted by the analog display 52. More particularly, it has been discovered that upon achieving the selective transmission or reflection of light in predetermined frequencies, the tint field can be adapted to attenuate just those frequencies such that the average visible spectrum transmission of the windshield is not reduced below the 70% requirement as mandated by federal law. In the present invention, the applicants have selected a color for the reverse printed translucent characters 60 which reflects or emits light waves which reside predominantly in the 625 through 700 nanometer band. In accordance with these teachings, the tint field 41 is adapted to absorb a high percentage of light produced in this particular band without excessively reducing the visible spectrum transmission average. While the windscreen 25 transmission in the 625 through 700 nanometer band is less than 50%, the visible spectrum average transmission is over 70%, which permits the windscreen to meet federal standards. By way of example, and more particularly by reference to FIG. 6, a graphic illustration 120 shows a line 121 which indicates windscreen light transmission as compared with the wavelength of the light for a windscreen utilizing a tint field 41 which is adapted to attenuate light in the 625 to 700 nanometer band. Further, the display face reflectance is indicated by the line labeled 122. This graphic illustration shows that an overall 70% light transmission requirement can be achieved by such selective attenuation.

It has been discovered that the substantial matching of the peak reflected frequencies of light produced by the translucent characters 60 to the minimum light transmission characteristics of the tint field 41 presents a three-fold benefit. The primary benefit is directed to reducing substantially the intensity of the secondary or ghost image. This effect is achieved because the light passing through the windscreen 25 and which causes the ghost image passes through the tint field 41 on two occasions. On each occasion, the ghost image is weakened to such an extent that it becomes barely perceptible in relative comparison to the primary image by the time it emerges in the operator's 14 line of sight. Further, and in addition to the foregoing, a secondary benefit of the tint field is to increase the image's contrast relative to the ambient background light by reducing the amount of in-band light, which is readily apparent in the background. In the present instance, the inventors have selected a color for the translucent characters 60, which lies in the red-orange band. However, this same concept can be applied to virtually any color band such that the reflected image may appear yellow, green, blue, orange or pure red. As should be understood, the present color was selected because of its contrast with those colors which are quite common in the immediate environment. A third benefit is achieved because the tint field 41 creates a point of interest which the operator 14 may look to when receiving information produced by the analog display 52.

It should be understood that the individual characters 60 operate as diffuse reflectors and which further are operable to transmit light received from the individual acrylic optical fibers and direct same towards the windscreen 25. In the preferred embodiment and as earlier discussed, the analog display 52 is manufactured from approximate 0.060 inch thick polycarbonate 60B which has applied thereto paint or ink which will act in the manner as heretofore disclosed. The selection of an appropriate paint or ink will normally include an analysis utilizing a spectragraph to determine the frequency of light reflected and thereafter an appropriate tint will be selected which will substantially attenuate the frequencies of light reflected. In practice, the thickness of the paint deposited on the polycarbonate will depend upon various factors including the light intensity as delivered by the light manifold as well as the application involved. However, it will be recognized that an increase in reflectivity of a character 60 will cause a decrease in its ability to transmit light received from an optical cable. In the present invention, the inventors have found it advisable to print the individual characters in the manner which is shown in FIG. 10 and which was discussed earlier.

A first embodiment of an electronic circuit 130 for controlling the coiled spring return meter movement 64 is operable to actuate the meter movement 64 to rotatably move the indicator needle 63 in a counterclockwise direction such that the reflection of the indicator needle appears to move in a proper direction when viewed from the operators position 12. By way of introduction, it should be understood that vehicle 11 is operable to produce an electronic pulse 131 which indicates the overland speed of the vehicle. The inventors have, for experimentation, utilized the electronic pulsed signals transmitted to a digital speedometer display which was installed on a 1989 Cutlass Supreme automobile. The electronic circuit 130 includes a multiplicity of electrical conductors 132. The vehicle 11 also includes a source of 12 volt power 133 which may be supplied by the vehicle's battery (not shown). The source of 12 volt power is supplied to a voltage regulator 134, which will hereinafter be referred to as a 7805 semiconductor chip (7805 IC) and which is commercially available through retail electronic stores nationwide. The 7805 IC 134 has an input 135, and an electrical conductor 136 electrically connects the source of 12 volt power with the 7805 IC. Further, the 7805 IC is operable to produce a substantially constant 5 volt output 137 which is supplied to the electronic circuit 130, as will hereinafter be described in further detail. The ground for the above-identified electronic circuit 130 is generally indicated by the numeral 140. The electronic circuit 130 includes a signal processor means which is indicated by the numeral 141 and which may be purchased in retail electronic outlets nationwide as a 555 integrated chip (555 IC), which is used as a monostable. The 555 IC 141 is adapted to process the electrical pulses 131 which are received from the vehicle 11 and produce substantially uniform electrical pulses having a magnitude or amplitude of not greater than 5 volts and a predetermined duration period. The 555 IC receives 5 volts of power from the 7805 IC. The 555 IC further includes a plurality of pins which are connected to the electrical conductors 132. These pins include a V+ pin 142, a threshold pin 143, a trigger pin 144, a DIS pin 145, an output pin 146, a reset pin 147, and a V/C pin 148.

A 5M ohm resistor 150 is electrically connected with the 555 IC 141. Further, a 1500 pF capacitor 151 and a 0.01 microfarad capacitor 152 are electrically connected to the 555 IC 141. A 3.9K ohm resistor 153 is electrically connected between the ground 140 and the electronic circuit 130. Further, first and second resistors having values of 10M ohm are serially connected to the electronic circuit 130 and are designated by the numerals 154 and 155, respectively. The electronic circuit 130 further includes first and second resistors 160 and 161 having values of 1500 pF and an operational amplifier 162, which is commercially available and designated as a 3130 integrated chip (3130 IC) and which is adapted to receive the processed signals produced by the 555 IC 141. The 3130 IC further operators as a two pole low band pass filter. The 3130 IC is commercially available through retail electrical supply stores nationwide. Electrically connected to the operational amplifier (3130 IC) is a 100K ohm potentiometer or variable resistor 163. The 100k ohm variable resistor 163 is adapted to set the maximum output voltage for the operational amplifier 162 which in the case of the analog speedometer display 52 is approximately 1.4 volts. The 100k ohm potentiometer comprises one portion of a calibration means whereby the coil spring return meter movement 64 is operable to move the indicator needle 63 to selective locations along the display face 52, and which correctly indicates the overland speed of the vehicle 11. The electronic circuit 130 includes a capacitor 164 having a value of 47 pF and a resistor having a value of 100K ohms 165. In addition, a 47 pF capacitor 170 is electrically connected to a second 100K ohm potentiometer or variable resistor 171. The second potentiometer constitutes a second portion of the calibration means which is adapted to set the minimum voltage output for the operational amplifier 162. In the present case, the minimum voltage lies in a range of approximately 0-0.3 volts. The operational amplifier includes inputs which are generally designated by the numeral 172 and an output 173. As should be understood, the electronic circuit 130 is adapted to receive and process the electrical pulses 131 produced by the vehicle 11 into a source of voltage for actuating the coil spring return meter movement 64 which varies linearly and inversely relative to the rate of electronic pulsing. Therefore, as the speed of the vehicle increases, the voltage output of the operational amplifier decreases. Conversely, when the vehicle speed decreases the voltage output increases, thereby causing the coiled spring return meter movement to move the needle in a proper direction when it is viewed in reflection from the operator's position. As earlier discussed, the coil spring return meter movement may be mechanically altered to achieve the desired affect. Further, no modification may be necessary in certain applications.

A second embodiment of an electronic circuit 180 for controlling the coiled spring return meter movement 64 is also operable to actuate the coiled spring return meter movement 64 such that it rotatably moves the indicator needle 63 in a counterclockwise direction such that the reflection of the indicator needle appearing in the windscreen appears to move in a proper direction when viewed from the operators position 12. The electronic circuit 180 includes in addition to several electronic components which were earlier discussed, a plurality of electrical conductors 181. Further, the electronic circuit 180 receives the electronic pulses 131, which indicates the overland speed of the vehicle 11 at a location in the vehicle 11 that is designated as A9. The electronic circuit receives a source of 12 volt power 133 through electrical conductor 90 and which is supplied by the vehicle's battery (not shown), and which may be accessed in the vehicle at a location which is designated A4. The source of 12 volt power is supplied to the voltage regulator 134 and which was described earlier as a 7805 semiconductor chip (7805 IC) and which is commercially available through retail electronic stores nationwide. As earlier discussed, the 7805 IC supplies a substantially constant 5 volt output 137 which is supplied to the electronic circuit 180. The ground for the above-identified electronic circuit 180 is generally indicated by the numeral 140. The electronic circuit 180 includes a 0.01 microfarad capacitor 182 which is electrically joined to the source of electrical pulses produced by the vehicle A9 (131). Further, the electronic circuit 180 includes a 10K ohm resistor 183 and a pair of diodes 184 which are electrically connected together to form a differentiator or signal modifier means 185 which is adapted to modify the vehicle electrical pulses in a manner to form electrical pulses having a predetermined wave form and amplitude. As shown herein, the electrical pulses produced by the signal modifier means 185 have an amplitude of not greater than 5 volts.

The electronic circuit 180 further includes a 100K ohm resistor 190 and a 0.1 microfarad capacitor 191 which are electrically connected to the 555 IC monostable 141 in the manner as best shown by reference to FIG. 11. Further, the electronic circuit 181 includes a 3.3K ohm resistor 192. The electronic circuit has a 100K ohm resistor 193 and a 2.2 microfarad capacitor 194 which comprise an integrator means which is generally indicated by the numeral 195, and which is adapted to receive the electrical pulses which have been processed by the 555 IC 141, and which forms an integrated voltage output. The electronic circuit 180 of the present invention includes a quad operational amplifier which is generally indicated by the numeral 196, and which is commercially available through retail electronic stores nationwide under the trade designation "LM324". In the present invention, the electronic circuit 180 utilizes only two of the four operational amplifiers available and therefore for simplicity, only those operational amplifiers are shown. The quad operational amplifier 196 includes a first operational amplifier which is generally indicated by the numeral 200 and which includes first, second, third and fourth pins 201 through 204, respectively. Pin 11 of the first operational amplifier is indicated by the number 205. As best illustrated by reference to FIG. 11, the first operational amplifier is electrically connected with the integrator means 195 and with the electrical power source 133 which is borne by the vehicle 11. Further, the first operational amplifier is adapted to produce a voltage output at pin 201 which is substantially linearly related to the pulse rate of the vehicle 11. A 100K ohm resistor 211 is electrically connected between the first operational amplifier and the second operational amplifier 212. The second operational amplifier 212 includes pins 12, 13 and 14 and which are designated by the numerals 213, 214 and 215, respectively. As best illustrated by reference to FIG. 11, the input for the second operational amplifier 214 is electrically connected with the output 201 of the first operational amplifier and the output 215 of the second operational amplifier is electrically connected to the return meter movement 64. The electronic circuit 180 includes means for calibrating the voltage output of the second operational amplifier. In the embodiment shown in FIG. 11, the calibration means includes first and second variable resistors 210 and 220, respectively, and which have individual resistance values of 100K ohms each. As should be understood, the first variable resistor 210 is operable to control the maximum voltage output for the second operational amplifier and the second variable resistor is adapted to control the minimum voltage output of the second operational amplifier. The maximum and minimum voltages were discussed earlier with respect to the first electronic circuit 130. The second electronic circuit 180 additionally includes the electrical circuit which was heretofore identified by the numeral 79 and which is adapted to selectively activate the Halogen lamp 75 in the manner which was previously described.

OPERATION

The operation of the described embodiment of the present invention is believed to be readily apparent and is briefly summarized at this point. The instrument display apparatus 10 for use in combination with a substantially transparent panel or windscreen 25, is best illustrated by reference to FIG. 1. As shown therein, the analog instrument display 52 is borne by the dashboard 15 and positioned such that incoming rays of natural light 110 can be reflected from the top surface 53 thereof. As earlier discussed, the display face includes a multiplicity or reverse printed translucent characters which are adapted to reflect the ambient natural light onto the substantially transparent windscreen 25. The reverse printed characters 60 as well as the engine malfunction characters 61 and 62 constitute a first portion or area of the analog display which is adapted to produce reflected or emitted light in a predetermined frequency range which is attenuated by the tint field 41 such that the reflected image appearing in the windscreen 25 is substantially free of all secondary or "ghost images".

The preferred embodiment of the present invention includes a predetermined tint field 41 which is borne by the windscreen 25, and which is adapted to selectively absorb the frequencies of light produced by the characters 60 whereby the reflected image of the characters appear in a predetermined location on the windscreen such that may be observed within the line of sight of the operator 14. The apparatus 10 further includes an auxiliary lighting assembly 70 which is adapted to produce artificial light which is selectively delivered to the individual translucent characters 60 by way of a light manifold 71 which is composed of a plurality of optical fibers 72. As earlier discussed, the light manifold may not be necessary in certain applications. In addition to the foregoing, means are provided for selectively activating the auxiliary lighting assembly 70 such that the individual translucent characters are artificially illuminated. This is accomplished by means of an electronic illumination control circuit 79 which is adapted to selectively actuate the light source 75 such that light energy may be transmitted to the individual characters with the result that they may be viewed in reflection in the predetermined tint field 41, regardless of the level of ambient natural light present. It should be understood, therefore, that as a vehicle 11 passes in and out of shaded areas, the photosensor 95 is adapted to trigger the operation of the electronic circuit 79 such that predetermined amounts of voltage power 81 is supplied to the high intensity Halogen light source 75, thus causing light energy to be emitted by the translucent characters such that a reflection of the individual characters may be seen in the predetermined tint field regardless of the ambient lighting conditions. During normal daylight hours, the ambient natural light 110 coming through the windscreen 25 supplies a large percentage of the light necessary to produce a reflected image which can be clearly seen in the tint field 41 of the windscreen 25. It should be understood that in some applications, however, a photosensor may be absent from the illumination control circuit 79.

Electronic circuits 130 and 180, respectively, comprise individual controlling means which are operable to convert electrical pulses 131 which are produced by the vehicle 11 as a function of its overland speed, and convert the electrical pulses into a predetermined voltage which varies linearly and inversely relative to the electrical pulse rate and which actuates the coil spring return meter movement 64 to urge the indicator needle to rotate in a proper direction such that a reflection of indicator needle appears to move in an appropriate direction when it is viewed from the operators position 12.

Therefore, the instrument display apparatus 10 of the present invention is particularly well suited for use in all manner of overland vehicles, aircraft and watercraft, is adapted to produce a reflected image which may be seen under all ambient lighting conditions, which can be mounted on a vehicle as standard equipment or can be produced in the manner of a retrofit, is compact, and easy to assemble and maintain.

Although the invention has been herein shown and described in what is conceived to be the most practical and preferred embodiments, it is recognized that departures may be made therefrom within the scope of the invention which is not to be limited to the illustrative details disclosed.

Having described our invention, what we claim as new and desire to secure by letters patent:

1. An instrument display apparatus for use by an operator who has a line of sight comprising:

a transparent panel;

a predetermined tint field made integral with the transparent panel and which provides the operator with substantially unrestricted viewing in all directions and which is operable to attenuate preselected wavelengths of light which pass through the tint field from all directions;

an instrument to be displayed disposed in a position adjacent to the transparent panel, and wherein the instrument has a dead front display face, and a means for illuminating the dead front display face, and wherein the dead front display face further includes at least one character, and wherein the dead front display face, when illuminated by the illumination means, emits light in the wavelengths which are attenuated by the tint field such that the character can be discerned, in reflection, when the operator looks through the tint field, and wherein the dead front display face substantially suppresses the reflection of ambient environmental light which strikes the dead front display face thereby substantially preventing the reflection of the character from appearing in the tint field unless the dead front display face is illuminated by the illumination means, and wherein the dead front display face further includes:

a transparent substrate;

a first translucent printed layer borne by the substrate and which passes light having wavelength attenuated by the tint field and which are emitted by the illumination means;

a second printed layer borne by the transparent substrate and which defines the boundary of the character and which has a color which provides contrast to the wavelengths of light passes by the first layer;

means for sensing the illumination level of the ambient environment; and an electrical circuit borne by the instrument and coupling the sensing means with the illumination means and which is operable to automatically adjust the illumination means in a fashion whereby the illumination provided to the dead front display face corresponds to the ambient illumination level, and wherein the character appearing in reflection in the tint field has sufficient contrast relative to the ambient illumination level such that the character can be readily recognized by the operator when viewing through the tint field.

2. An instrument display apparatus as claimed in claim 1 and wherein the illumination means includes an incandescent halogen lamp.

3. An instrument display face as claimed in claim 1, and wherein the illumination means includes a lamp which is positioned in a remote location, and a light guiding pipe or fiber optic element which receives the light emitted by the lamp and delivers it to the instrument.

4. An instrument display face as claimed in claim 1, and wherein the illumination means includes a high intensity light emitting diode.

5. An instrument display apparatus comprising:
- a transparent panel;
- an enhancing film made integral with the transparent panel and which is operable to attenuate preselected wavelengths of light which pass through the enhancing film and which originate from all directions, the enhancing film providing unrestricted viewing through the transparent panel in all directions;
- an instrument to be displayed disposed in proximity to the enhancing film and including means for illuminating the instrument, the instrument emitting light in the selected wavelengths attenuated by the enhancing film when the illumination means is energized whereby the image of the instrument appears in the enhancing film, and wherein the enhancing film further attenuates the selected wavelengths of light which originate from locations other than the illumination means whereby the contrast of the instrument image appearing in the enhancing film is further improved relative to the background ambient lighting conditions, and wherein the instrument further includes:
- a first portion which is translucent and substantially nonreflective, and wherein the first portion passes light produced by the illumination means and having the wavelengths which are attenuated by the enhancing film;
- a second portion positioned in close proximity to the first portion and which provides contrast for the first portion, and which further defines the instrument image which appears in reflection in the enhancing film, the second portion being substantially nonreflective;
- means for sensing the illumination level of the ambient environment; and
- an electrical circuit borne by the instrument and coupling the sensing means with the illumination means and which is operable to adjust the illumination means in a fashion whereby the illumination provided to the instrument corresponds to the ambient illumination level, and wherein the instrument image appearing in reflection in the tint field has sufficient contrast relative to the ambient illumination level such that the instrument image can be readily recognized by the operator when viewing through the tint field.

6. An instrument display apparatus for use by an operator who has a line of sight comprising:
- a transparent panel which provides the operator with substantially unrestricted viewing in all directions and which further is operable to reflect light into the line of sight of the operator;
- an instrument to be displayed positioned adjacent to the transparent panel and which includes a dead front display face, and a means for illuminating the dead front display face, and wherein the image of the display face appears in reflection in the transparent panel when the illumination means is energized, and wherein the dead front display face substantially suppresses the reflection of ambient natural light which strikes the dead front display face thereby substantially preventing the image of the display face from appearing in reflection in the transparent panel unless the illumination means is energized and wherein the dead front display face further includes:
- a supporting substrate;
- a first translucent area borne by the substrate and which passes light having wavelengths which are reflected by the transparent panel and which are emitted by the illumination means;
- a second substantially nonreflective area borne by the substrate, and which defines the instrument image, and which further has a color which provides contrast to the wavelengths of light passes by the first area; and
- an illumination control circuit borne by the instrument for adjusting the intensity of the illumination provided to the dead front display face by the illumination means.

* * * * *

UNITED STATES PATENT AND TRADEMARK OFFICE
CERTIFICATE OF CORRECTION

PATENT NO. : 5,128,659
DATED : July 7, 1992
INVENTOR(S) : John K. Roberts and Barnes W. Woodhall It is certified that error appears in the above—identified patent and that said Letters Patent is hereby corrected as shown below:

Column 6, Line 11, after the word "character", delete the --. Respectively--, and insert --, respectively--.

Column 14, Line 39, delete the word "wavelength" and insert --wavelengths--.

Column 14, Line 45, delete the word "passes" and insert --passed--.

Column 16, Line 37, delete the word "passes" and insert --passed--.

Signed and Sealed this

Twenty-fourth Day of August, 1993

Attest:

BRUCE LEHMAN

*Attesting Officer*  *Commissioner of Patents and Trademarks*